United States Patent
Kumar et al.

(10) Patent No.: US 11,818,092 B2
(45) Date of Patent: Nov. 14, 2023

(54) INTERNET PROTOCOL SCHEMA GENERATION

(71) Applicant: Rakuten Mobile, Inc., Tokyo (JP)

(72) Inventors: Nitish Kumar, Madhya Pradesh (IN); Pawan Shriwas, Madhya Pradesh (IN); Niyank Bam, Madhya Pradesh (IN); Pratik Mahajan, Madhya Pradesh (IN); Mohammodh Irfan, Madhya Pradesh (IN); Mahesh Hanwatkar, Madhya Pradesh (IN)

(73) Assignee: RAKUTEN MOBILE, INC., Tokyo (JP)

( * ) Notice: Subject to any disclaimer, the term of this patent is extended or adjusted under 35 U.S.C. 154(b) by 0 days.

(21) Appl. No.: 17/583,194

(22) Filed: Jan. 25, 2022

(65) Prior Publication Data

US 2023/0239267 A1 Jul. 27, 2023

(51) Int. Cl.
  *G06F 15/177* (2006.01)
  *G06F 15/16* (2006.01)
  *H04L 61/5007* (2022.01)
  *H04L 101/604* (2022.01)

(52) U.S. Cl.
  CPC .... *H04L 61/5007* (2022.05); *H04L 2101/604* (2022.05)

(58) Field of Classification Search
  CPC ................................................. H04L 61/5007
  See application file for complete search history.

(56) References Cited

U.S. PATENT DOCUMENTS

| | | |
|---|---|---|
| 6,157,953 A | 12/2000 | Chang et al. |
| 2003/0217122 A1* | 11/2003 | Roese ............... H04L 67/04 709/219 |
| 2006/0230124 A1* | 10/2006 | Belfiore ............ G06F 16/958 709/219 |
| 2006/0248083 A1* | 11/2006 | Sack ............... G06F 21/6218 707/999.009 |
| 2014/0304775 A1* | 10/2014 | Kumar ................ H04W 4/02 726/3 |
| 2016/0103911 A1* | 4/2016 | Logue ............... H04L 67/025 707/695 |
| 2018/0063075 A1 | 3/2018 | Eckert et al. |
| 2018/0367501 A1* | 12/2018 | Khan ................. H04L 41/22 |
| 2019/0327274 A1* | 10/2019 | Baumgart ........... H04L 63/101 |
| 2020/0220804 A1* | 7/2020 | Mathews ............. H04L 45/12 |

* cited by examiner

*Primary Examiner* — Christopher B Robinson
(74) *Attorney, Agent, or Firm* — HAUPTMAN HAM, LLP

(57) ABSTRACT

A method includes receiving a request to create an Internet Protocol (IP) schema on a network from a first user. The method further includes receiving a list of IP parameters associated with a device connected to the network. The method further includes receiving a positional encoding for the IP parameters that associates the IP parameters to bit locations in an IP address. The method further includes determining whether the first user is authorized to create the IP schema. The method further includes generating, in response to a determination that the first user is authorized, the IP schema based on the positional encoding for the IP parameters.

20 Claims, 5 Drawing Sheets

INTERNET PROTOCOL SCHEMA GENERATION

BACKGROUND

Internet Protocol (IP) addresses are unique identifiers for each device within a network. IP addresses help with network interface identification as well as location information. IP addresses are often arbitrarily assigned without any characteristics within the IP address that provide information about the device or the network. In some instances, the arbitrary assigning of IP addresses also causes a redundancy or conflict within the assigned IP address. Arbitrarily assigned IP addresses often are used in combination with a database to track a correlation between the device and the IP address that was assigned. Inaccuracies or corruption of such a database would present problems with precision in device tracking within the network.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
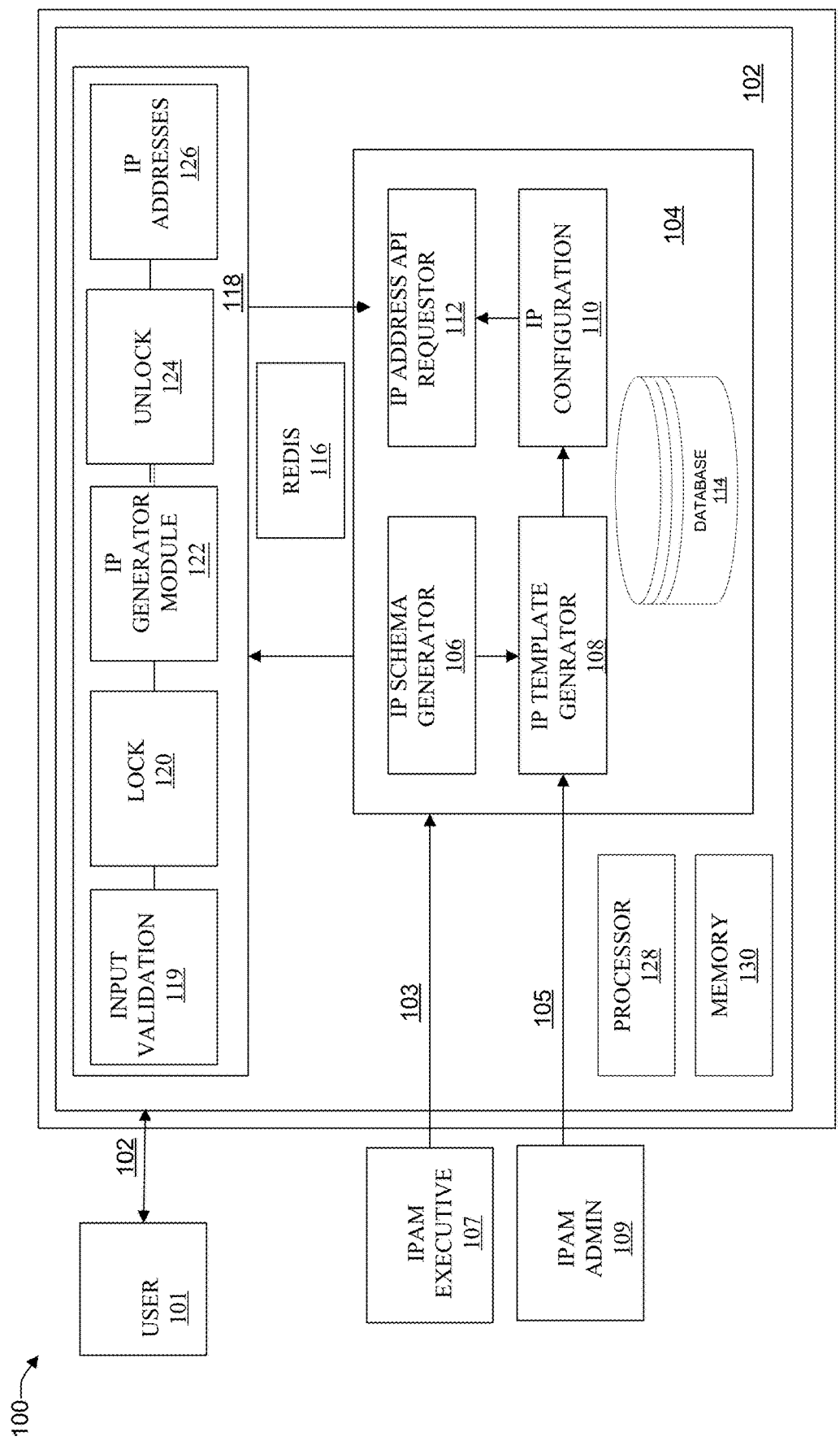
FIG. 1 is a diagram of a system for internet protocol schema generation, according to at least one embodiment of the present system.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. In addition, the present disclosure may repeat reference numerals and/or letters in the various examples. This repetition is for the purpose of simplicity and clarity and does not in itself dictate a relationship between the various embodiments and/or configurations discussed.

In some embodiments, a system generates an IP address with a logical assignment of IP addresses in a cloud environment. The system is able to generate an IP template based on an IP schema. In some examples, an IP schema is based on IP network parameter information such as the vendor of a device, a service category of a device or a part of the network, a service type or device type specific assignment logic. In some embodiments, the system is able to generate an IP template to configure one or more IP address associated with a category, type of service or a vendor based on the IP schema. In some embodiments, the system is able to generate an IP address using the IP template that includes one or more properties as part of the IP address to identify related devices.

In some embodiment, the IP addresses generated using the IP template allow the system to increase consistency, reduce the time spent on provisioning new devices, reduce or prevent potential conflicts in IP addresses, and provide meaningful and identifiable IP addresses on the network.

In radio access networks, arbitrary assignment of IP addresses without identifiable bits in IP addresses reduces trackability of devices, and increases a risk of redundancy or conflicts in IP addresses.

FIG. 1 is a diagram of a system 100 for IP Schema, IP template, according to at least one embodiment of the present system. The diagram includes system 100 for hosting a cloud architecture 102. In some embodiments, the system 100 includes components described hereinafter in FIG. 5. In some embodiments, the system 100 hosts a cluster of servers, such as a cloud service. In some embodiments, the system 100 hosts a public cloud. In some embodiments, the system 100 hosts a private cloud.

In some embodiments, the cloud architecture 102 includes a processor 128 and a memory 130. The cloud architecture 102 provides resources and manages services, such as virtual machines and services, to connect the resources on the cloud.

In some embodiments, the cloud architecture 102 is an Open RAN environment, the RAN is disaggregated into three main building blocks, the Radio Unit (RU), the Distributed Unit (DU), and the centralized Unit (CU). In some embodiments, the RU receives, transmits, amplifies, and digitizes the radio frequency signals. In some embodiments, the RU is located near, or integrated into an antenna to avoid or reduce radio frequency interference. In some embodiments, the DU and the CU form a computational component of a base station, sending the digitalized radio signal into the network. In some embodiments, the DU is physically located at or near the RU. In some embodiments, the CU is physically separated from the DU and RU and is located nearer the core. In some embodiments, the cloud environment 102 implements the Open RAN based on protocols and interfaces between these various building blocks (radios, hardware, and software) in the RAN. Examples of Open RAN interfaces include a front-haul between the Radio Unit and the Distributed Unit, mid-haul between the Distributed Unit and the Centralized Unit and Backhaul connecting the RAN to the core. In some embodiments, the DU and the CU are virtualized and run in a server or a cluster of servers.

The system 100 includes an IP address management server 104. In some embodiments, the IP management server 104 is a virtual server. In some embodiments, the IP address management server 104 is a process running on a cloud service, such as on the cloud architecture 102. In some embodiments, the IP address management server 104 includes an IP schema generator 106, an IP template generator 108, an IP configuration script 110, an IP address API requestor 112, and a database 114. In some embodiments, the IP address management server 104 interfaces with one or more users 107, 109 via an API. In some embodiments, the IP address management server 104 serves as a webpage over the network.

In some embodiments, the IP address management server 104 receives a request to generate an IP schema. For example, the user 107 requests the IP address management server 104 to generate an IP schema. In some embodiments, the IP schema generator 106 receives information from the database 114 regarding IP parameters of a network. In some embodiments, the IP parameters of the network include information about the hierarchy and interconnections between the various devices on a network, the layers in the network, the vendor of a network device, the service category the network device is used in, the type of service provided by the device, the type of service provided by the network device, or the like. For example, the IP schema generator in an Open RAN can receive information about the configuration and devices in different layers of the network such as the RU, DU and CU. In at least one example, the IP schema generator 106 receives information about the RU that includes information about the vendor of the RU, the frequency of the radio waves, the direction the RU is pointed in, the location of the RU, the type of service the RU provides such as a $4^{th}$ generation radio network, or the like.

In some embodiments, user 109 provides an IP planning design for logical assignment of IP addresses to devices. In some embodiments, the IP planning design is based on the IP parameters of the network that enables an authorized user, with information about the IP planning design, to discern information about the location of a device, the position of the device in the hierarchy of devices, or the like. For example, the authorized user allocates a specific portion of the IP address with a specific alpha-numeric bit entry to all devices located in New York. The alpha-numeric bit entry allows authorized users to use the IP address to decipher information about the device. Users without access to the IP planning design cannot discern much information without access to multiple devices on the network. This obscurity improves security of the IP addresses and the Open RAN. In some embodiments, the IP schema generator 106 receives position encoding for the IP parameters from the user 109. For example, the user 109 allocates bits with specific information that signifies the location of the device, the type of service provided by the device, or the like. In some embodiments, the system 100 receives via an application programming interface (API) such as a cloud API information that should be assigned to a specific bit in the IP address to indicate the location of service is New York. In some embodiments, the system 100 presents a graphical user interface (GUI) on a webpage to receive information. In some embodiments, the system 100 receives via the API information about a range of bits that are allocated to devices of the same type. For example, the range of bits following a fixed bit usable for all RUs in the network from a specific vendor. The range of bits is allocated to multiple RU's while the fixed bit identifies the vendor.

In some embodiments, the IP schema provides a list of bits that have specific meaning and a means to allocate the bits in specific positions to specific values, a range of values or both based on the IP planning information. In some embodiments, the IP address management server 104 determines whether the first user, such as user 109, is authorized to create the IP schema. In some embodiments, the first X bits in the IP address are assigned via the IP schema. For example, the IP schema generator 106 assigns the first 64 bits in a 128-bit IP address based on the IP schema; and the other bits are assigned without the use of the IP schema.

In some embodiments, the IP address management server 104 based on a determination that the user 107 is authorized to create the IP schema, generates the IP schema based on the position encoding for the IP parameters. In some embodiments, the IP address management server 104 requests approval from another user before the IP schema is created, such as from the user 109. In some embodiments, in response to a determination that the user 107 is not authorized to create the IP schema, the IP address management server 104 generates the IP address without the IP schema. In some embodiments, in response to a determination that the user 107 is not authorized to create the IP schema, the IP address management server 104 is configured to generate an alert, such as an audio or visual alert. In some embodiments, the alert is transmitted, such as wirelessly transmitted, to a system administrator, such as user 109.

In some examples, the operations of the components of the system 100 are executed by a processor 128 based on machine readable instructions stored in a non-volatile computer readable memory 130. In some examples, one or more of the operations of the components of the system 100 are executed on a different processor. In some examples, the operations of the components of the system 100 are split between multiple processors.

In some embodiments, the IP address management server 104 receives a request to generate an IP template. For example, the user 107 requests generation of an IP template. In some embodiments, an IP template describes assignment of bits in IP addresses for one or more devices that are requested or used often. For example, while deploying RUs a vendor requests IP addresses for each of the RUs, and any new equipment such as routers to connect the RU to the Open RAN. In some embodiments, the IP address management server 104 receives IP template parameters that define the relationships between the device and other devices that are often used in combination, the position of the combination of devices in a network, the configuration the combination of the devices, or the like. In some embodiments, frequent configurations are stored in a database, such as database 114, accessible by the IP template generator 108 for generating the IP template requested by the user 107. The IP address management server 104 provides an API to receive information from the user 107. In at least one example, the IP address management server 104 serves as a webpage with a graphical user interface to receive information from the user 107 about a part of the network.

In some embodiments, the IP address management server 104 receives a list of IP template parameters associated with the network from the database 114, wherein the IP template parameters includes information about a first part of the network, such as the information for configuring one or more devices that are used together or multiple devices of the same type or for the same service being deployed together. In some embodiments, the IP address management server 104 determines whether the first user is authorized to create the IP template. In some embodiments, the IP address management server 104 based on the determination that the first user is authorized, generates an IP template, using the IP template generator 108, based on IP schema, from the IP schema generator 106, for the first part of the network address. In some embodiments, in response to a determination that the user 107 is not authorized to create the IP template, the IP address management server 104 informs the user 107 that the user 107 does not have authorization to create the IP template. In some embodiments, in response to a determination that the user 107 is not authorized to create the IP template, the IP address management server 104 is configured to generate an alert, such as an audio or visual alert. In some embodiments, the alert is transmitted, such as wirelessly transmitted, to a system administrator, such as user 109. In some embodiments, the IP address management server 104 receives information about the first part of the network address from the user 107. In some embodiments, the IP address management server 104 requests approval from the user 107 before generating the IP template. In some examples, the IP template provides information such as the dynamic IP ranges for the devices that are part of a service or template based on the IP schema. For example, the IP template is able to further allocate bits in the IP address to the first part of the network address to allow differentiation of the devices, types, or the like. In some examples, the IP template simplifies deployment of IP addresses to devices and maintains consistency between configurations. In some examples, the user 107 dynamically generates an IP template for a specific deployment to help identify devices associated with that deployment.

In some embodiments, the IP address management server 104 receives a request from the user 107 on behalf of the user 101 to generate an IP address. In some embodiments, the IP address management server 104 generates an IP address based on the IP schema and the IP template. In some embodiments, the IP address management server 104 requests authorization from a second user, such as user 109, based on the IP template or the IP schema. For example, the IP configuration script 110 determines, based on the IP template or the IP schema, that the IP address requested is a device or a type of service that is located higher up in the hierarchy of the network that the user 107 is authorized to address and, based on the information request, additional authorization from the second user, such as user 109, is to be requested before generating the IP address.

In some embodiments, the IP address management server 104 receives a request from a user 101 to generate an IP address. The IP address management server 104 notifies the user 107 about the request. In some embodiments, the user 101 is not a member of the organization running the Open RAN. For example, the user 101 is a vendor who deploys RUs amongst other vendors. The IP address management server 104 shields the network by segregating the IP generation process from the vendors. In some embodiments, the IP address management server 104 receives an IP Template that applies to the request from the user 101. In some embodiment, the IP address management server 104 requests additional information from the user 107 based on the IP template and the IP schema. For example, the IP address management server 104 requests information, such as the superblock of the device or part of the network, a cluster ID of the device, a Fabric ID of the device, a radio control port node number, or a Node Type to generate an IP address.

In some embodiments, the IP address management server 104 generates the IP address using an IP address generation API. The IP address generation gateway 118 includes an input validation module 119, a lock module 120, an IP generation module 122, an unlock module 124 and an IP address generator 126. In some embodiments, the IP address generation gateway 118 validates the input from the user 101 based on the information from the IP schema and the IP template. In at least one example, the IP schema includes information about system assigned bits and user generated bits. The IP address management server 104 queries the database 114 via an API which links the IP generation gateway 118 and the IP address management server 104. The API firewalls the information about the network from the user 101. In some embodiments, the IP address management server 104 locks the IP address space using the lock module 120 to prevent conflicts when IP addresses are requested by two different vendors for the same device at the same time. In some embodiments, the IP generator module 122 generates the IP address and reserves the IP address for the device in communication with the IP address management server 104. For example, a DNS server generates the IP address.

In some embodiments, the IP generator module 122 communicates via an API with the IP address API requestor 112. In some embodiments, the unlock module 124 unlocks the IP address space other than the IP schema after the IP address is generated. In some embodiments, the IP address generator 126 acts as an interface to the IP address API requestor 112. In some embodiments, a caching server such as the Redis 116 server stores a list of IP addresses that are already issued to validate the information from the user 101.

In some embodiments, the IP generation gateway 118 requests authorization before the IP address is released to the user 101. In some embodiments, the IP generation gateway 118 requests authorization from the user 107 or the user 109.

Figure 2:
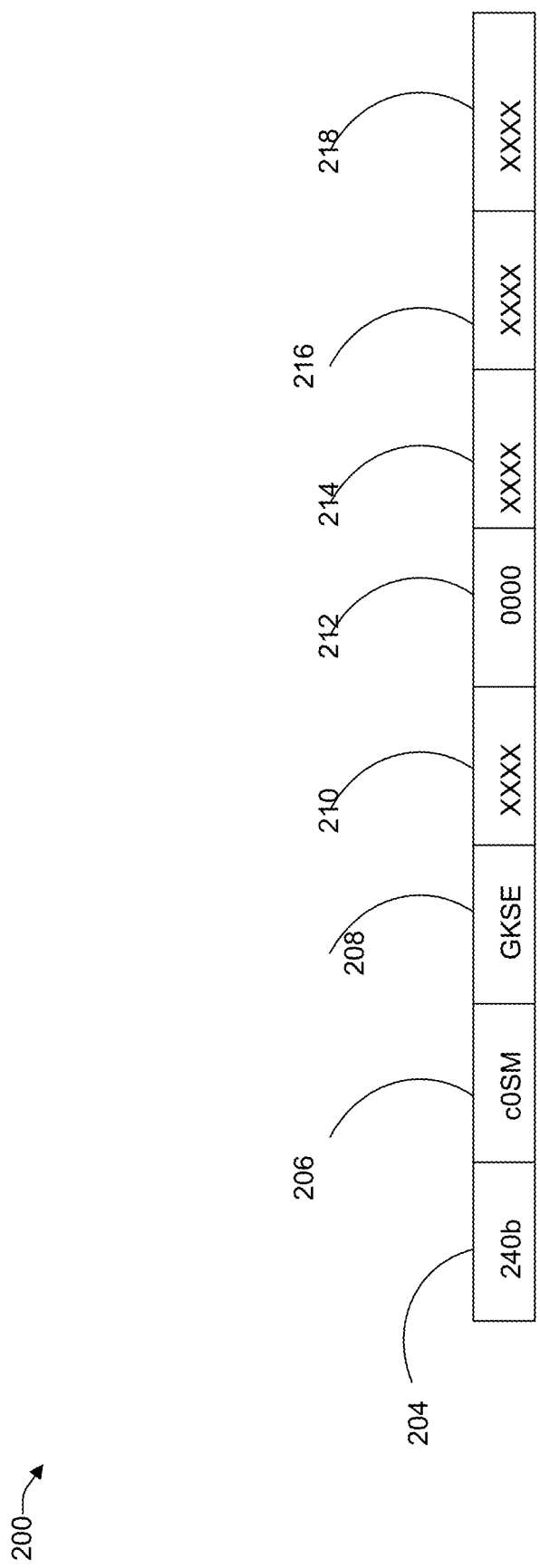
FIG. 2 is an exemplary IP schema generated according to at least one embodiment of the present system.

FIG. 2 is an exemplary IP schema generated, according to at least one embodiment of the present system. In some embodiments, the IP schema 200 is generated using the system 100 (FIG. 1). In some embodiments, a first four bits 204 of the IP schema 200 is based on the IP address block reserved for the service provider. For example, the first four bits 204 has a value of 240*b*. In some embodiments, a second four bits 206 of the IP schema indicates amongst other details, the super block identifier, or a mobile ring number. For example, the IP schema a bit in the second four bits 206, such as S indicates the super block in identifier which describes where the device or service is located. For example, the name of a city in an Open RAN deployment where the device is located. For example, the values indicate the service is located in New York, Washington D.C., and the like. In some embodiments, four bits in a third four bits 208, such as K indicates the infrastructure or service associated with the device. Examples of infrastructure or service in the schema K includes user equipment type such as 4th Generation network, $5^{th}$ Generation network, Wi-Fi, infrastructure, service application, or the like. In some embodiments, a fourth four bits 210 of the IP schema are reserved for assignment to groups of devices during IP generation.

In some embodiments, the values indicated by XXXX are user configurable values that are selectable amongst one or more predetermined choices. In some examples, the configurable values are binary. In some examples, the configurable values are alpha-numeric digits to encode details about the network parameters. In some embodiments, the value indicated with S, and M are obtained from the user.

The IP schema 200 includes other sets of bits 212-218. These sets of bits are usable to provide other identifying information for the device. In some embodiments, one or more of the sets of bits 212-218 are usable to identify a deployment of the device. In some embodiments, one or more of the sets of bits 212-218 are usable to identify a type of the device. In some embodiments, one or more of the sets of bits 212-218 are usable to identify a hierarchical position of the device in the network. In some embodiments, one or more of the sets of bits 212-218 are usable to identify devices above or below the device in the hierarchy of the network. One of ordinary skill in the art would recognize that other combinations of identifying information within the IP schema 200 are within the scope of this disclosure.

Figure 3:
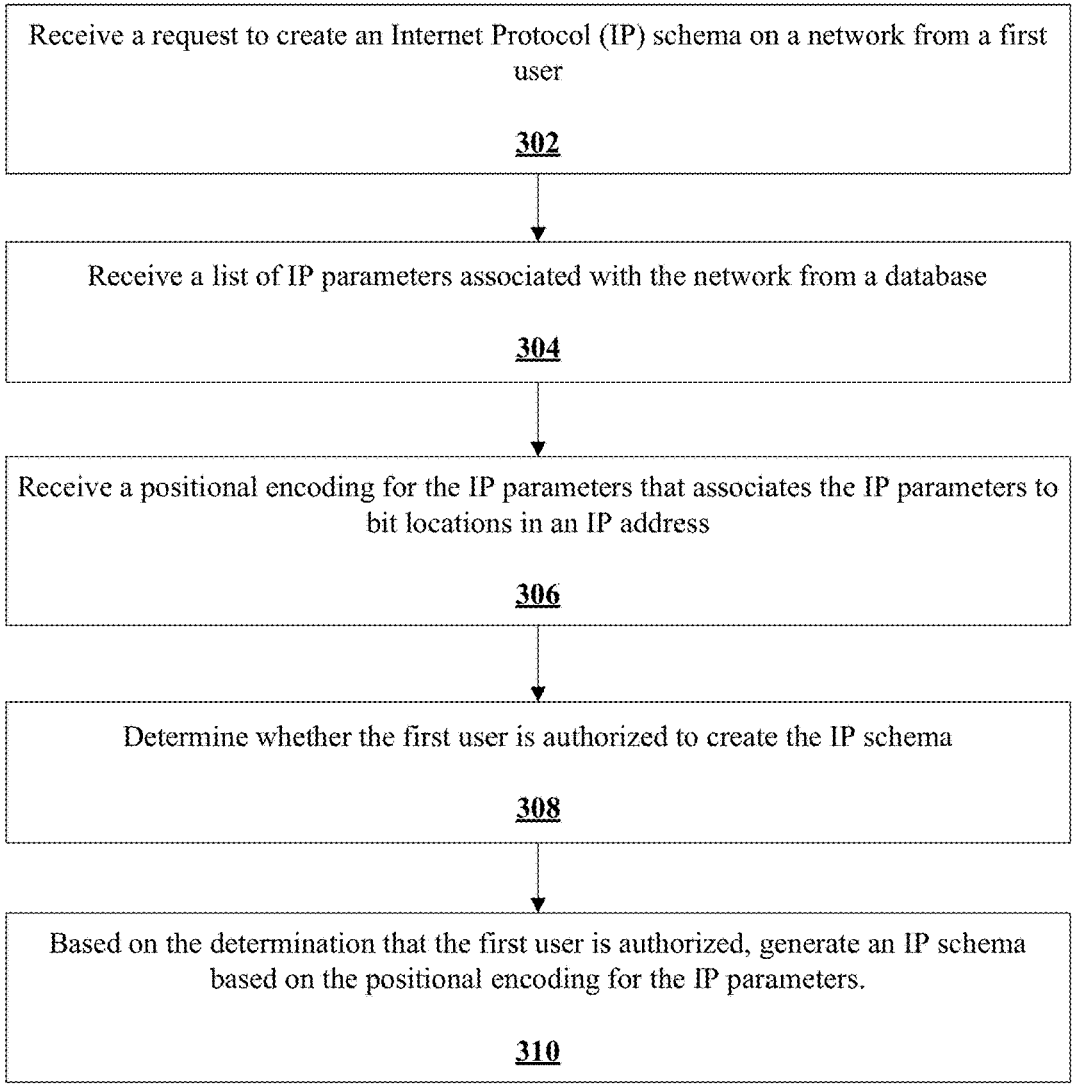
FIG. 3 is an operational flow of a method for determining an IP schema, according to at least one embodiment of the present system.

FIG. 3 is an operational flow for a method 300 of determining an IP schema in accordance with at least one embodiment. In some embodiments, the method 300 is implemented using a controller of a system, such as system 100 (FIG. 1), or another suitable system. In at least some embodiments, the method is performed by the system 100 shown in FIG. 1 or a controller 500 shown in FIG. 5 including sections for performing certain operations, such as the controller 500 shown in FIG. 5 which will be explained hereinafter.

At operation 302, the controller receives a request to create an Internet Protocol (IP) schema on a network from a first user. For example, the controller receives a request to allocate values for bits in the IP address and the positional encoding of the bits. In some embodiments, the positional encoding with the value of the bits indicates the type of device, the type of the network, the type of the service, the location of the device, or the like. In some embodiments, the first user provides information about the IP parameters to be encoded via a schema reference document. In some embodiments, the first user provides information about the IP parameters via an interactive graphical user interface served via a web browser.

In some embodiments, at operation 304, the controller receives a list of IP parameters associated with the network from a database. For example, the IP parameters associated with the network includes information about the types of devices, the relationship between the devices, such as the ports through which they are connected to each other, the location of the devices, the type of the device, the service the device is associated with, or the like.

In some embodiments, at operation 306, the controller receives a positional encoding for the IP parameters that associates the IP parameters to bit locations in an IP address. In some embodiments, at operation 306, the position encoding for the IP parameters includes user defined values that correspond to one or more attributes in the list of IP addresses. For example, the IP parameters, such as a cluster where the device is located, are obtained from the user, and assigned a specific bit encoding to identify the cluster moving forward and to distinguish other similar clusters.

In some embodiments, at operation 308, the controller determines whether the first user is authorized to create the IP schema. In some embodiments, the controller authenticates the first user before allowing the first user to create the IP schema.

In some embodiments, at operation 310, the controller based on the determination that the first user is authorized, generates an IP schema based on the positional encoding for the IP parameters. In some embodiments, the controller generates the IP schema based on the bit values generated by the system or provided by the user. The controller stores the IP schema in a database. In some embodiments, in response to the controller determining that the first user is not authorized, the controller generates an alert, such as a visual or audio alert. In some embodiments, the alert is transmitted to the first user. In some embodiments, the alert is transmitted to user other than the first user, such as a network administrator. In some embodiments, the alert is wirelessly transmitted to the first user or the other user.

In some embodiments, the controller in response to a request to generate an IP address uses the IP schema to determine the bits that are pre-assigned with information and the bits that require information from the user before generating an IP address. In some embodiments, the controller uses the IP template to associate labels with the value of bits to allow switching between values using a graphical user interface. For example, the IP template indicates a specific location in the IP address indicates whether a port has access to certain services. In some embodiments, the controller receives a Boolean input from the user with the help of the labels in the IP template to determine whether to flip the bit between zero and one to indicate access or lack of access.

In some embodiments, additional operations are included in the method 300. For example, in some embodiments, the alert is generated in response to the first user not being authorized. In some embodiments, at least one operation is omitted. For example, in some embodiments where the network is open source, the operation 308 is omitted. In some embodiments, an order of operations in method 300 is adjusted. For example, in some embodiments, the operation 304 is performed prior to the operation 302. One of ordinary skill in the art would recognize that additional modifications to method 300 are also possible.

Figure 4:
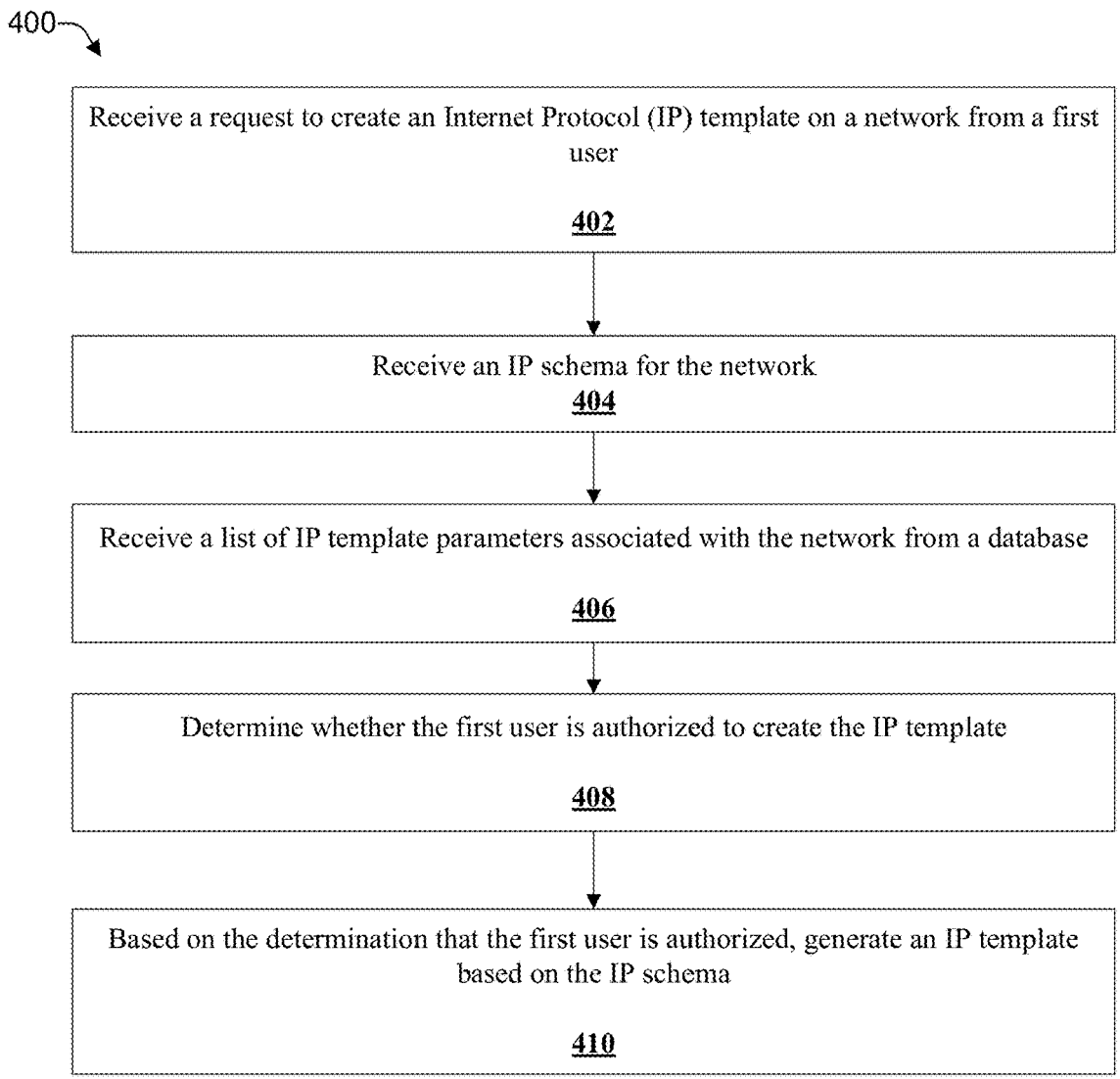
FIG. 4 is an operational flow of a method for determining an IP template, according to at least one embodiment of the present system.

FIG. 4 is an operational flow for a method 400 of determining an IP template in accordance with at least one embodiment. In some embodiments, the method 400 is implemented using a controller of a system, such as system 100 (FIG. 1), or another suitable system. In at least some embodiments, the method is performed by the system 100 shown in FIG. 1 or a controller 500 shown in FIG. 5 including sections for performing certain operations, such as the controller 500 shown in FIG. 5 which will be explained hereinafter.

At operation 402, the controller, receives a request to create an Internet Protocol (IP) template on a network from a first user, such as user 107 (FIG. 1). In some embodiments, the controller receives the request based on an IP generation request from a user without sufficient privileges. In some embodiments, the controller receives the request from the first user to obtain approval for an IP generation on a part of the network as part of the check and balances to separate the role of the IP assignment from the role of configuring the network.

In some embodiments, at operation 404, the controller retrieves an IP schema for the network. In some embodiments, the IP schema describes a position coding system to encode information about the devices on the network such as the type of the device, the function of the device, the location of the device and the like. In some embodiments, the IP schema defines only a part of the IP address. In some embodiments, the IP schema defines system generated bits and user generated bits. For example, the IP schema the controller generates the bits that are used to indicate the location of a device. For example, the controller generates a predefined bit to indicate the location of the device as New York. For example, the controller generates the bit based on input from the user for a cluster that has a cluster id to allow ease of identification where there are multiple clusters within the network.

In some embodiments, at operation 406 the controller receives a list of IP template parameters associated with the network from a database, wherein the IP template parameters includes information about a first part of the network. In some embodiments, the controller receives IP template parameters that describe the contents to be requested associated to generate the encoded bits that comply with the IP schema while generating an IP address. Examples of such parameters include the request id, the devices that are part of the IP template, the number of nodes or network interfaces on the device, the number of IP addresses required, the type of use for the device, or the like. In some embodiments, the controller receives IP template parameters that describe one or more devices that are configured for deployment together and the ports that are shared or the nodes that are linked together between these devices. In some embodiments, the controller receives IP template parameters that provide a positional encoding of some bits in the IP address that indicate parameters of the device nodes. Examples of the IP template parameters include system generated values and user generated values. In some embodiments, the IP template parameters associate positional encoding bits with names and configurable values to allow generation of the IP. In some embodiments, the IP template add additional system generated values user generated values which are used during generation of the IP address.

In some embodiments, at operation 408 the controller determines whether the first user is authorized to create the IP template. In at least one example, the controller determines the authorization based on a database with permissions information.

In some embodiments, at operation 410, the controller based on the determination that the first user is authorized, generates an IP template based on the IP schema. In some embodiments, the controller generates the IP template based on the bit values generated by the system or selected by the user. The controller stores the IP template in a database. In some embodiments, in response to the controller determining that the first user is not authorized, the controller generates an alert, such as a visual or audio alert. In some embodiments, the alert is transmitted to the first user. In some embodiments, the alert is transmitted to user other than the first user, such as a network administrator. In some embodiments, the alert is wirelessly transmitted to the first user or the other user.

In some embodiments, the controller in response to a request to generate an IP address uses the IP template to determine the bits that are pre-assigned with information and the bits that require information from the user before generating an IP address. In some embodiments, the controller uses the IP template to associate labels with the value of bits to allow switching between values using a graphical user interface. For example, the IP template indicates a specific location in the IP address indicates whether a port has access to certain services. In some embodiments, the controller receives a Boolean input from the user with the help of the labels in the IP template to determine whether to flip the bit between zero and one to indicate access or lack of access.

In some embodiments, additional operations are included in the method 400. For example, in some embodiments, the alert is generated in response to the first user not being authorized. In some embodiments, at least one operation is omitted. For example, in some embodiments where the network is open source, the operation 408 is omitted. In some embodiments, an order of operations in method 400 is adjusted. For example, in some embodiments, the operation 404 is performed prior to the operation 402. One of ordinary skill in the art would recognize that additional modifications to method 400 are also possible.

Figure 5:
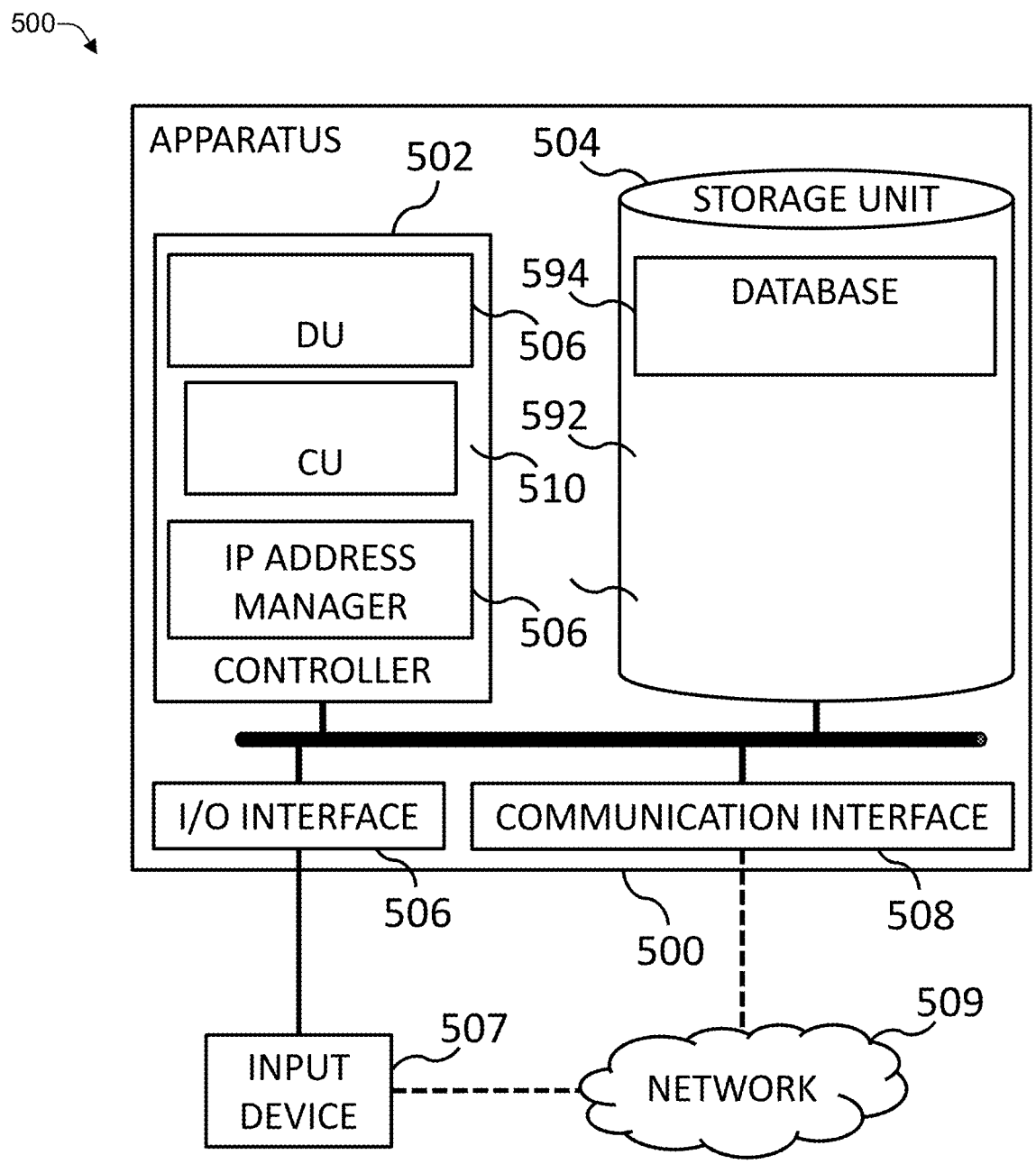
FIG. 5 is a block diagram of an exemplary hardware configuration for generating IP schema and IP template, according to at least one embodiment of the present system.

FIG. 5 is a block diagram of an exemplary hardware configuration for generating IP schema and IP template, according to at least one embodiment of the system. The exemplary hardware configuration includes the system 100, which communicates with network 509, and interacts with input device 507. In at least some embodiments, apparatus 500 is a computer or other computing device that receives input or commands from input device 507. In at least some embodiments, the system 100 is a host server that connects directly to input device 507, or indirectly through network 509. In at least some embodiments, the system 100 is a computer system that includes two or more computers. In at least some embodiments, the system 100 is a personal computer that executes an application for a user of the system 100.

The system 100 includes a controller 502, a storage unit 504, a communication interface 508, and an input/output interface 506. In at least some embodiments, controller 502 includes a processor or programmable circuitry executing instructions to cause the processor or programmable circuitry to perform operations according to the instructions. In at least some embodiments, controller 502 includes analog or digital programmable circuitry, or any combination thereof. In at least some embodiments, controller 502 includes physically separated storage or circuitry that interacts through communication. In at least some embodiments, storage unit 504 includes a non-volatile computer-readable medium capable of storing executable and non-executable data for access by controller 502 during execution of the instructions. Communication interface 508 transmits and receives data from network 509. Input/output interface 506 connects to various input and output units, such as input device 507, via a parallel port, a serial port, a keyboard port, a mouse port, a monitor port, and the like to accept commands and present information.

Controller 502 includes the Radio Unit (RU) 504, the Distributed Unit (DU) 506, the centralized Unit (CU), the IP Address management server 510, the core. In some embodiments, the Radio Unit (RU) 504, a Distributed Unit (DU) 506, a centralized Unit (CU) and a core 514 are configured based on a virtual machine or a cluster of virtual machines. The DU 506, CU 510, core 514 or a combination thereof is the circuitry or instructions of controller 502 configured to process a stream of information from a DU 506, CU 510, core 514 or a combination thereof. In at least some embodiments, DU 506, CU 510, core 514 or a combination thereof is configured to receive information such as information from an open-RAN network. In at least some embodiments, the DU 506, CU 510, core 514 or a combination thereof is configured for deployment of a software service in a cloud native environment to process information in real-time. In at least some embodiments, the DU 506, CU 510, core 514 or a combination thereof records information to storage unit 504, such as the site database 890, and utilize information in storage unit 504. In at least some embodiments, the DU 506, CU 510, core 514 or a combination thereof includes subsections for performing additional functions, as described in the foregoing flow charts. In at least some embodiments, such sub-sections may be referred to by a name associated with their function.

In at least some embodiments, the apparatus is another device capable of processing logical functions to perform the operations herein. In at least some embodiments, the controller and the storage unit need not be entirely separate devices but share circuitry or one or more computer-readable mediums in some embodiments. In at least some embodiments, the storage unit includes a hard drive storing both the computer-executable instructions and the data accessed by the controller, and the controller includes a combination of a central processing unit (CPU) and RAM, in which the computer-executable instructions are able to be copied in whole or in part for execution by the CPU during performance of the operations herein.

In at least some embodiments where the apparatus is a computer, a program that is installed in the computer is capable of causing the computer to function as or perform operations associated with apparatuses of the embodiments described herein. In at least some embodiments, such a program is executable by a processor to cause the computer to perform certain operations associated with some or all the blocks of flowcharts and block diagrams described herein. Various embodiments of the present system are described with reference to flowcharts and block diagrams whose blocks may represent (1) steps of processes in which operations are performed or (2) sections of a controller responsible for performing operations. Certain steps and sections are implemented by dedicated circuitry, programmable circuitry supplied with computer-readable instructions stored on computer-readable media, and/or processors supplied with computer-readable instructions stored on computer-readable media. In some embodiments, dedicated circuitry includes digital and/or analog hardware circuits and may include integrated circuits (IC) and/or discrete circuits. In some embodiments, programmable circuitry includes reconfigurable hardware circuits comprising logical AND, OR XOR, NAND, NOR, and other logical operations, flip-flops, registers, memory elements, etc., such as field-programmable gate arrays (FPGA), programmable logic arrays (PLA), etc.

Various embodiments of the present system include a system, a method, and/or a computer program product. In some embodiments, the computer program product includes a computer readable storage medium (or media) having computer readable program instructions thereon for causing a processor to carry out aspects of the present system. In some embodiments, the computer readable storage medium includes a tangible device that is able to retain and store instructions for use by an instruction execution device. In some embodiments, the computer readable storage medium includes, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. In some embodiments, computer readable program instructions described herein are downloadable to respective computing/processing devices from a computer readable storage medium or to an external computer or external storage device via a network, for example, the Internet, a local area network, a wide area network and/or a wireless network. In some embodiments, the network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

In some embodiments, computer readable program instructions for carrying out operations described above are assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. In some embodiments, the computer readable program instructions are executed entirely on the user's computer, partly on the user's computer, as a stand-alone software package, partly on the user's computer and partly on a remote computer or entirely on the remote computer or server. In some embodiments, in the latter scenario, the remote computer is connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) execute the computer readable program instructions by utilizing state information of the computer readable program instructions to individualize the electronic circuitry, to perform aspects of the present system.

While embodiments of the present system have been described, the technical scope of any subject matter claimed is not limited to the above-described embodiments. It will be apparent to persons skilled in the art that various alterations and improvements can be added to the above-described embodiments. It will also be apparent from the scope of the claims that the embodiments added with such alterations or improvements are included in the technical scope of the system.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the processes must be performed in this order.

While embodiments of the present system have been described, the technical scope of any subject matter claimed is not limited to the above-described embodiments. It will be apparent to persons skilled in the art that various alterations and improvements can be added to the above-described embodiments. It will also be apparent from the scope of the claims that the embodiments added with such alterations or improvements are included in the technical scope of the system. The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the processes must be performed in this order.

An aspect of this description relates to a computer-readable medium including instructions executable by a computer. The instructions are configured to cause the computer to receive a request to create an Internet Protocol (IP) schema on a network from a first user. The instructions are configured to cause the computer to receive a list of IP parameters associated with a device connected to the network. The instructions are configured to cause the computer to receive a positional encoding for the IP parameters that associates the IP parameters to bit locations in an IP address. The instructions are configured to cause the computer to determine whether the first user is authorized to create the IP schema. The instructions are configured to cause the computer to generate, in response to a determination that the first user is authorized, the IP schema based on the positional encoding for the IP parameters. In some embodiments, the instructions executable by the computer are configured to cause the computer to receive a set of user defined values corresponding to one or more attributes in the list of IP attributes; determine a set of system generated values corresponding to one or more attributes in the list of IP attributes; and determine the position of the IP attributes in the IP address based on the set of user defined attributes and the set of system determined attributes. In some embodiments, the instructions executable by the computer are configured to cause the computer to receive a set of user defined values corresponding to one or more attributes in the list of IP attributes; and determine the position of the IP attributes in the IP address based on the set of user defined attributes. In some embodiments, the instructions executable by the computer are configured to cause the computer to determine a set of system generated values that corresponds to one or more attributes in the list of IP attributes; and determine the position of the IP attributes in the IP address based on the set of system determined attributes. In some embodiments, the instructions executable by the computer are configured to cause the computer to generate the IP address, wherein the IP address includes the IP schema in a portion of the IP address. In some embodiments, the instructions executable by the computer are configured to cause the computer to generate, in response to a determination that the first user is not authorized, an alert. In some embodiments, the instructions executable by the computer are configured to cause the computer to receive the list of IP parameters associated with the device including a physical location of the device. In some embodiments, the instructions executable by the computer are configured to cause the computer to receive the list of IP parameters associated with the device including a relationship between the device and a second device connected to the network.

An aspect of this description relates to a method. The method includes receiving a request to create an Internet Protocol (IP) schema on a network from a first user. The method further includes receiving a list of IP parameters associated with a device connected to the network. The method further includes receiving a positional encoding for the IP parameters that associates the IP parameters to bit locations in an IP address. The method further includes determining whether the first user is authorized to create the IP schema. The method further includes generating, in response to a determination that the first user is authorized, the IP schema based on the positional encoding for the IP parameters. In some embodiments, the method further includes receiving a set of user defined values corresponding to one or more attributes in the list of IP attributes; determine a set of system generated values corresponding to one or more attributes in the list of IP attributes; and determine the position of the IP attributes in the IP address based on the set of user defined attributes and the set of system determined attributes. In some embodiments, the method further includes receiving a set of user defined values corresponding to one or more attributes in the list of IP attributes; and determining the position of the IP attributes in the IP address based on the set of user defined attributes. In some embodiments, the method further includes determining a set of system generated values that corresponds to one or more attributes in the list of IP attributes; and determining the position of the IP attributes in the IP address based on the set of system determined attributes. In some embodiments, the method further includes generating the IP address, wherein the IP address includes the IP schema in a portion of the IP address. In some embodiments, the method further includes generating, in response to a determination that the first user is not authorized, an alert. In some embodiments, the method further includes receiving the list of IP parameters associated with the device including a physical location of the device. In some embodiments, the method further includes receiving the list of IP parameters associated with the device including a relationship between the device and a second device connected to the network.

An aspect of this description relates to a system. The system includes a controller including circuitry. The controller is configured to receive a request to create an Internet Protocol (IP) schema on a network from a first user. The controller is further configured to receive a list of IP parameters associated with a device connected to the network. The controller is further configured to receive a positional encoding for the IP parameters that associates the IP parameters to bit locations in an IP address. The controller is further configured to determine whether the first user is authorized to create the IP schema. The controller is further configured to generate, in response to a determination that the first user is authorized, the IP schema based on the positional encoding for the IP parameters. In some embodiments, the controller is further configured to receive a set of user defined values corresponding to one or more attributes in the list of IP attributes; determine a set of system generated values corresponding to one or more attributes in the list of IP attributes; and determine the position of the IP attributes in the IP address based on the set of user defined attributes and the set of system determined attributes. In some embodiments, the controller is further configured to receive the list of IP parameters associated with the device including a physical location of the device. In some embodiments, the controller is further configured to receive the list of IP parameters associated with the device including a relationship between the device and a second device connected to the network.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure. The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A system for generating an Internet Protocol (IP) schema, the system comprising:
a controller including circuitry configured to:
receive a request to create the IP schema on a network from a first user;
receive a list of IP parameters associated with a device connected to the network;
receive a positional encoding for the IP parameters that associates the IP parameters to bit locations in an IP address;
determine whether the first user is authorized to create the IP schema;
generate, in response to a determination that the first user is authorized, the IP schema based on the positional encoding for the IP parameters; and
generate, in response to a determination that the first user is not authorized, an alert, wherein the first user is authorized to access the network.

2. The system of claim 1, wherein the controller is further configured to:
receive a set of user defined values corresponding to one or more attributes in the list of IP attributes;
determine a set of system generated values corresponding to one or more attributes in the list of IP attributes; and
determine the position of the IP attributes in the IP address based on the set of user defined attributes and the set of system determined attributes.

3. The system of claim 1, wherein the controller is further configured to:
receive the list of IP parameters associated with the device including a physical location of the device.

4. The system of claim 1, wherein the controller is further configured to: receive the list of IP parameters associated with the device including a relationship between the device and a second device connected to the network.

5. A method of generating an Internet Protocol (IP) schema, the method comprising:
receiving a request to create the IP schema on a network from a first user;
receiving a list of IP parameters associated with a device connected to the network;
receiving a positional encoding for the IP parameters that associates the IP parameters to bit locations in an IP address;
determining whether the first user is authorized to create the IP schema;
generating, in response to a determination that the first user is authorized, the IP schema based on the positional encoding for the IP parameters; and
generating, in response to a determination that the first user is not authorized, an alert, wherein the first user is authorized to access the network.

6. The method of claim 5, further comprising:
receiving a set of user defined values corresponding to one or more attributes in the list of IP attributes;
determine a set of system generated values corresponding to one or more attributes in the list of IP attributes; and
determine the position of the IP attributes in the IP address based on the set of user defined attributes and the set of system determined attributes.

7. The method of claim 5, further comprising:
receiving a set of user defined values corresponding to one or more attributes in the list of IP attributes; and
determining the position of the IP attributes in the IP address based on the set of user defined attributes.

8. The method of claim 5, further comprising:
determining a set of system generated values that corresponds to one or more attributes in the list of IP attributes; and
determining the position of the IP attributes in the IP address based on the set of system determined attributes.

9. The method of claim 5, further comprising:
generating the IP address, wherein the IP address includes the IP schema in a portion of the IP address.

10. The method of claim 5, wherein the IP parameters include a frequency of radio waves emitted by the device, a direction in which the device is pointed, and a geographic location of the device.

11. The method of claim 5, further comprising:
receiving the list of IP parameters associated with the device including a physical location of the device.

12. The method of claim 5, further comprising:
receiving the list of IP parameters associated with the device including a relationship between the device and a second device connected to the network.

13. A computer-readable medium including instructions executable by a computer to cause the computer to perform operations for creating an Internet Protocol (IP) schema, the operations comprising:
receive a request to create the IP schema on a network from a first user;
receive a list of IP parameters associated with a device connected to the network;
receive a positional encoding for the IP parameters that associates the IP parameters to bit locations in an IP address;
determine whether the first user is authorized to create the IP schema;
generate, in response to a determination that the first user is authorized, the IP schema based on the positional encoding for the IP parameters; and
generate, in response to a determination that the first user is not authorized, an alert, wherein the first user is authorized to access the network.

14. The computer-readable medium of claim 13, wherein the instructions executable by the computer are configured to cause the computer to:
receive a set of user defined values corresponding to one or more attributes in the list of IP attributes;
determine a set of system generated values corresponding to one or more attributes in the list of IP attributes; and
determine the position of the IP attributes in the IP address based on the set of user defined attributes and the set of system determined attributes.

15. The computer-readable medium of claim 13, wherein the instructions executable by the computer are configured to cause the computer to:
receive a set of user defined values corresponding to one or more attributes in the list of IP attributes; and
determine the position of the IP attributes in the IP address based on the set of user defined attributes.

16. The computer-readable medium of claim 13, wherein the instructions executable by the computer are configured to cause the computer to:
determine a set of system generated values that corresponds to one or more attributes in the list of IP attributes; and
determine the position of the IP attributes in the IP address based on the set of system determined attributes.

17. The computer-readable medium of claim 13, wherein the instructions executable by the computer are configured to cause the computer to:
  generate the IP address, wherein the IP address includes the IP schema in a portion of the IP address.

18. The computer-readable medium of claim 13, wherein the IP parameters include a frequency of radio waves emitted by the device, a direction in which the device is pointed, and a geographic location of the device.

19. The computer-readable medium of claim 13, wherein the instructions executable by the computer are configured to cause the computer to:
  receive the list of IP parameters associated with the device including a physical location of the device.

20. The computer-readable medium of claim 13, wherein the instructions executable by the computer are configured to cause the computer to:
  receive the list of IP parameters associated with the device including a relationship between the device and a second device connected to the network.

\* \* \* \* \*